United States Patent
Schmidt et al.

(10) Patent No.: US 9,491,628 B2
(45) Date of Patent: Nov. 8, 2016

(54) SYSTEM AND METHOD FOR MITIGATING INTERFERENCE WHEN INITIALIZING LINKS BETWEEN COGNITIVE RADIOS

(71) Applicant: Spectrum Bridge, Inc., Lake Mary, FL (US)

(72) Inventors: Jeffery C. Schmidt, Orlando, FL (US); Don Joslyn, DeBary, FL (US); Sekhar V. Uppalapati, Longwood, FL (US); Santosh Hari, Lake Mary, FL (US)

(73) Assignee: Spectrum Bridge, Inc., Lake Mary, FL (US)

( * ) Notice: Subject to any disclaimer, the term of this patent is extended or adjusted under 35 U.S.C. 154(b) by 106 days.

(21) Appl. No.: 14/573,260

(22) Filed: Dec. 17, 2014

(65) Prior Publication Data

US 2015/0189513 A1    Jul. 2, 2015

Related U.S. Application Data

(60) Provisional application No. 61/920,850, filed on Dec. 26, 2013.

(51) Int. Cl.
*H04L 1/00* (2006.01)
*H04W 16/02* (2009.01)
*H04W 16/14* (2009.01)
*H04W 52/34* (2009.01)

(52) U.S. Cl.
CPC ............ *H04W 16/02* (2013.01); *H04W 16/14* (2013.01); *H04W 52/346* (2013.01)

(58) Field of Classification Search
CPC ... H04W 72/04; H04W 72/05; H04W 72/06; H04W 80/04; H04W 80/05; H04W 80/06; H04W 80/07; H04W 80/08

USPC ....... 370/312, 329, 328, 230, 468, 462, 236, 370/346, 342, 335
See application file for complete search history.

(56) References Cited

U.S. PATENT DOCUMENTS

| | | | |
|---|---|---|---|
| 6,907,229 B2 | 6/2005 | Shpak | |
| 8,249,966 B2 | 8/2012 | Stanforth | |
| 2010/0261423 A1* | 10/2010 | Stanforth | H04H 20/72 455/3.01 |
| 2011/0250915 A1* | 10/2011 | Stanforth | H04W 16/14 455/509 |

OTHER PUBLICATIONS

International Search Report and Written Opinion from corresponding PCT Application No. PCT/US2014/071896, dated Mar. 26, 2015.

* cited by examiner

*Primary Examiner* — Dady Chery
(74) *Attorney, Agent, or Firm* — Tucker Ellis LLP (57) ABSTRACT

Generic access credentials for use by a spoke radio device in communications with a hub radio device to acquire specific access credentials for the spoke radio device are determined by a spectrum management server to minimize the possibility of creating undesirable interference to other radio systems. The spectrum management server determines a coverage area of the hub radio device and determines sub-regions of the coverage area; determines a generic access transmit power limit for each sub-region of the coverage area for one or more channels on which the hub radio device has access rights to engage in wireless communications; and transmits the generic access transmit power level for each sub-region and channel combination to the hub radio device.

7 Claims, 3 Drawing Sheets

SYSTEM AND METHOD FOR MITIGATING INTERFERENCE WHEN INITIALIZING LINKS BETWEEN COGNITIVE RADIOS

RELATED APPLICATION DATA

This application claims the benefit of U.S. Provisional Patent Application No. 61/920,850, filed Dec. 26, 2013, the disclosure of which is herein incorporated by reference in its entirety.

TECHNICAL FIELD OF THE INVENTION

The technology of the present disclosure relates generally to wireless communications and, more particularly, to a system and method for facilitating channel map acquisition in "spoke" radio devices that do not have a direct Internet connection. The channel map may be acquired through a "hub" radio device that does have an Internet connection. Interference to protected radio devices caused by link establishment between the spoke and hub radio devices is minimized.

BACKGROUND

Spectrum sharing is thought of as one of the most viable ways of improving the amount of spectrum available to wireless networks and other radio devices for conducting wireless communications. An exemplary spectrum sharing technique involves use of television white spaces under regulations set forth by an appropriate regulatory agency. An exemplary regulatory agency that regulates the use of wireless spectrum is the U.S. Federal Communications Commission (FCC). Other countries may have similar regulatory entities.

In the U.S., for example, the FCC has eliminated analog television (TV) broadcasts in favor of digital TV broadcasts. This has freed spectrum channels for use by unlicensed radio systems to offer various services, such as mobile communications and Internet access. In this context, the freed spectrum is commonly referred to as TV white space (or TVWS) but other types of white spaces are possible. In the case of TV white space, the white space is comprised of unused spectrum that is interleaved with spectrum used by incumbent radio devices in the channel 2 to channel 51 range (corresponding to 54 MHz to 698 MHz). Exemplary incumbent radio devices for TV white space include television broadcasters and other priority users of television channels. Under FCC regulations, for example, radio devices that use TVWS must register with a central database server (also referred to as a spectrum management server) and receive a channel list (also referred to as a channel map) of available channels for which the radio device may use in a shared environment with other TV band devices (TVBDs) while minimizing the possibility of creating undesirable interference to incumbent radio systems. The channel list that is generated for a radio device is generated by the central database server based on the location of the radio device. In this manner, the operation of incumbent radio devices having protected areas in which the radio device is located may be taken into account when determining channel availability.

Also, regulators and industry groups have proposed the use of geo-location database technology to control or manage spectrum access for radios in other situations. For example, use of geo-location database technology has been proposed for the 5 GHz UNII bands and for the 3.550 GHz to 3.650 GHz bands in which the U.S. government and military are incumbent users.

Outside the U.S., use of geo-location database technology has been proposed for TVWS bands in a number of countries. In the European Union (EU), TVWS sharing is often referred to as authorized shared access (ASA) and/or licensed shared access (LSA). Exemplary regulations for ASA/LSA are outlined in European Telecommunications Standards Institute (ETSI) EN 301 598. Other standards bodies have also proposed mechanisms for supporting spectrum sharing, such as the Internet Engineering Task Force's (IETF) Protocol to Access White Space (PAWS).

In cognitive radio ecosystems, such as the above-mentioned TV white space environment, it is common for a first radio device (e.g., a first TVBD) to establish wireless connectivity with a second radio device (e.g., a second TVBD). Under controlling regulations, the connectivity typically must be established without causing interference to primary, incumbent or other concurrent radio devices (collectively referred to as incumbent users).

An exemplary radio device involved in this situation may be a fixed-location TVDB device that is connected to the Internet over a medium that does not cause impermissible interference to another radio device. The medium over which Internet connectivity is made may be, for example, a terrestrial connection or a cellular connection. As will become clear from the following, this radio device may be considered a hub radio device due to its relationship with another radio device, which may be considered a spoke radio device.

The hub radio device may acquire a channel list from a geo-location database (also referred to a spectrum management server). The channel list authorizes the hub radio device to transmit on specified channels, at a specified location, at a maximum power, and for a specified period of time.

An issue arises when the spoke radio device (another TVBD in the example), which does not have independent access to the Internet, attempts to acquire a channel list from the geo-location database using a radio link established with the hub radio device as a pathway for Internet access. The two radio devices are considered hub and spoke radio devices due to their relationship with one another relative to the Internet connection.

Since the spoke radio device is in a different location than the hub radio device, an authorized channel list for the spoke radio device may not include an authorization for the same channel(s) used by the hub radio device. The channels used by the hub radio device may not be authorized for use by TVBDs, including the spoke radio device, in the location of the spoke radio device due to presence of an incumbent user with a protected boundary area that encompasses the location of the spoke radio device, but not the location of the hub radio device.

This is a dilemma. But, at least in the U.S., the Federal Communications Commission (FCC) considers this a special situation and allows limited use of the operational channel of the hub radio device by the spoke radio device under the following regulation set forth in 47 C.F.R. §15.711(e):

Fixed Devices without a Direct Connection to the Internet.

If a fixed TVBD does not have a direct connection to the Internet and has not yet been initialized and registered with the TV bands database consistent with §15.713, but can receive the transmissions of another fixed TVBD, the fixed TVBD needing initialization may transmit to that other fixed TVBD on either a channel that the other TVBD has transmitted on or on a channel which the other TVBD indicates is available for use to access the database to register its location and receive a list of channels that are available for it to use. Subsequently, the newly registered TVBD must only use the television channels that the database indicates are available for it to use. A fixed device may not obtain lists of available channels from another fixed device as provided by a TV bands database for such other device, i.e., a fixed device may not simply operate on the list of available channels provided by a TV bands database for another fixed device with which it communicates but must contact a database to obtain a list of available channels on which it may operate.

A consequence of this pragmatic methodology is the creation of a transient condition that might cause brief unintended interference to operations of incumbent users.

Other approaches may result in comparatively less transient interference in this situation. For example, certain regulations do not allow the flexibility of temporary communications that exceed certain transmit power thresholds. Unfortunately, these constraints have consequences that may promote unreliable or artificially hindered communications. As an example, European regulators have specified a situation in which a fixed device (e.g., the hub in the foregoing example) with a terrestrial connection to a database/server may acquire a "generic" channel authorization list and a "specific" channel authentication list. The specific channel authorization list allows normal use of the channel(s) in the list with other devices that also have specific authorization to use the channel(s). The "generic" channel authorization list allows communications with devices that do not have specific authorization, but these communications are more constrained.

The generic list of channels is the same as the specific list of channels, but includes a transmit power limit for each channel. The transmit power limit is the lowest authorized transmit power at any location in the hub's coverage area. The spoke, regardless of its location in the coverage area of the hub, may not transmit with a power above the limit for the relevant channel. The transmit power limit values may differ on a channel-by-channel basis.

More specifically, the area that includes the coverage area of the hub radio device is broken up into "pixels" where each pixel is a square unit area or some other predefined shape and area. The transmit power limit for each channel is determined by comparing the maximum allowable transmit power for every "pixel" overlapping with the coverage area and selecting the lowest value for the channel. This "lowest value" represents the maximum allowable transmit power for the channel that may be used by another non-specifically authorized device during communications with the hub (e.g., to use the hub as a pathway or proxy to obtain a channel list). To make other radio devices aware of the generic channel availability, the hub radio device broadcasts a beacon with a list of channels and an allowable transmit power for each channel in the list.

An exemplary channel list with generic operating parameters for the entirety of the hub's coverage area may be specified in a simple list format or in a table format with channel and transmit power entries (CH, TX POWER). An example is set forth in table 1.

TABLE 1

| Channel | Transmit Power |
|---------|----------------|
| CH 1    | 0 dBm          |
| CH 2    | 12 dBm         |
| .       | .              |
| .       | .              |
| CH 13   | 3 dBm          |

Under this approach, the spoke radio device may use the generic operational parameters specified in the beacon to communicate with the hub, including the generic transmit power as a maximum transmit power. By way of these communications and using the hub radio device as a communications pathway or proxy, the spoke radio device may request specific operational parameters (e.g., an authorized channel list) for the geographic location of the spoke radio device from the server hosting the geo-location database functions.

Figure 1:
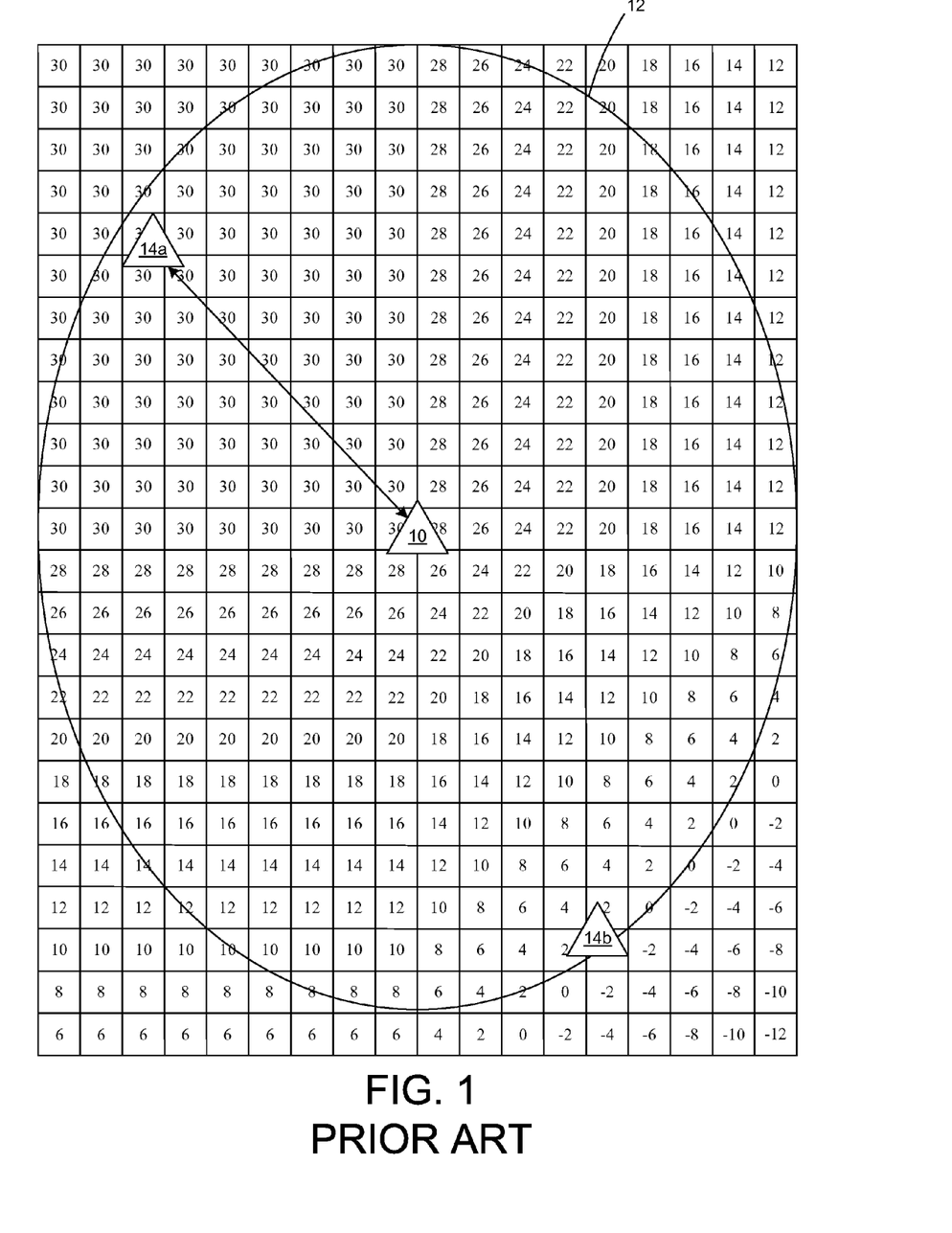
FIG. 1 is a schematic view of a representative spectrum environment in which generic channel authorizations are determined in a conventional manner.

But, as shown in FIG. 1, it is likely that the specific operational parameters will be more favorable (i.e., allow higher transmit power) and enable a more reliable communications link than the generic parameters. FIG. 1 shows an exemplary hub radio device 10 and a coverage area 12 of the hub radio device 10. In the illustrated example, the coverage area 12 has a maximum range of about 10 miles (about 16 kilometers) from the location of the hub radio device 10. The geographic area that includes the coverage area 12 is divided into square-shaped pixels. In each pixel, a representative maximum allowable transmit power in dBm for the pixel is shown for a single channel. Also shown are two exemplary spoke radio devices 14a and 14b at different locations in the coverage area 12 of the hub radio device 10. In the illustrated example, the hub radio device 10 may be authorized to transmit at 30 dBm at its specific location. If it had specific channel authorization to use the channel of the illustrated example, the spoke radio device 14a also would be able to transmit at 30 dBm. But the lowest allowable transmit power in the exemplary coverage area 12, which occurs at the location of the spoke radio device 14b, is only 0 dBm. This lowest allowable transmit power represents the generic transmit power limit for the channel for the entire coverage area 12. Therefore, without specific authorization, the spoke radio device 14a in this example may communicate with the hub radio device 10 using a maximum transmit power of 0 dBm.

In this scenario, is that it is highly unlikely that the hub radio device 10 will receive transmitted data from the spoke radio devices 14a, 14b (e.g., a specific operating parameter request) since the transmit power of the spoke radio devices 14a, 14b is limited to be much less than the transmit power of the hub radio device 10. Signal reception will still be a problem even if the data rate is drastically reduced to increase link budget. Moreover, reducing the data rate further complicates the situation by requiring the hub radio device 10 to listen at varying data rates.

Another problem occurs if the hub radio device 10 and the spoke radio device 14a or 14b are able to initially establish and achieve reliable communications that enable the exchange and confirmation of specific operating parameters with higher allowable transmit power. Establishment of such a link might occur during quiet conditions, such as at night. But, from time to time, the hub radio device 10 may reacquire specific operating parameters due to a reboot or expiration of earlier specific operating parameters. In this case, further communications over the original link between the hub radio device 10 and the spoke radio device 14 may not be possible, thereby artificially inhibiting communications.

DETAILED DESCRIPTION OF EMBODIMENTS

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

Disclosed are systems and methods to determine generic operating parameters for areas that are smaller than an entire coverage area of a hub radio device. The generic operating parameters may be established by a central geo-location database server and supplied to the hub radio device for broadcast in a beacon transmitted by the hub radio device. The generic operating parameters are established in a manner that minimizes the possibility of creating undesirable interference to protected radio systems. The central geo-location database server may be a whitespace management server that supplies white space channel maps (also referred to as a white space channel lists) or other white space spectrum authorizations to TVBDs.

Figure 2:
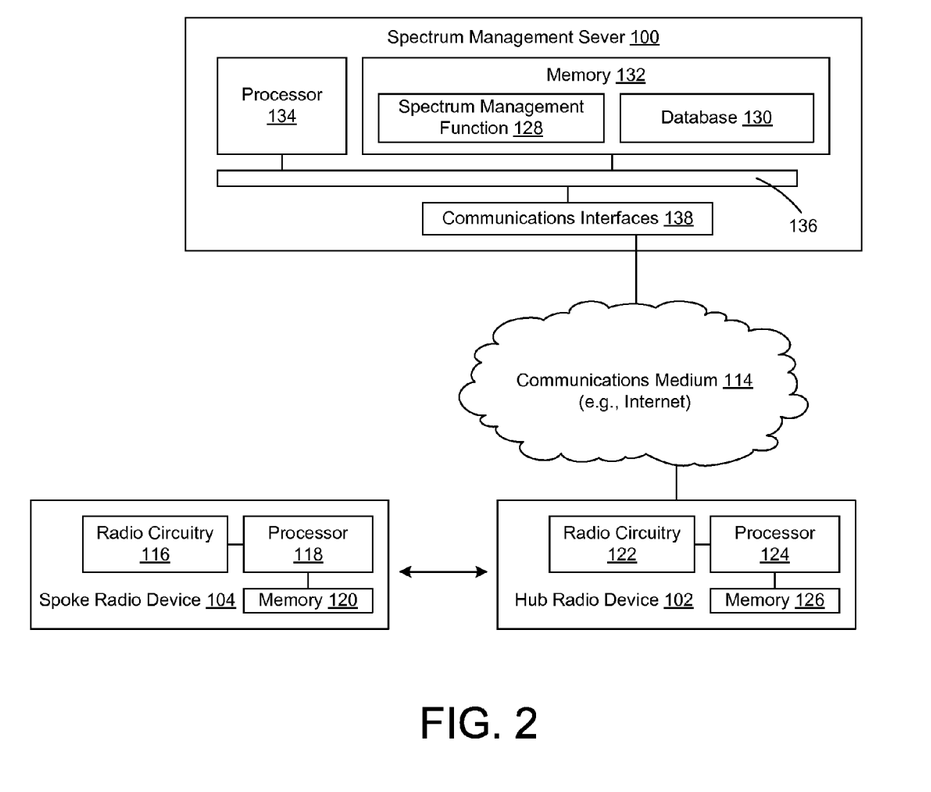
FIG. 2 is a schematic diagram of an exemplary system for facilitating channel map acquisition for spoke radio devices according to the present invention.

With reference to FIG. 2, shown is an exemplary system in which channel map acquisition for spoke radio devices that do not have a direct Internet connection is facilitated. The system includes a server 100, a hub radio device 102 and a spoke radio device 104. The hub and spoke radio devices 102, 104 may be TVBDs. As will be described, each of the server 100, the hub radio device 102 and the spoke radio device 104 are configured to carry out the respective logical functions that are described herein.

Figure 3:
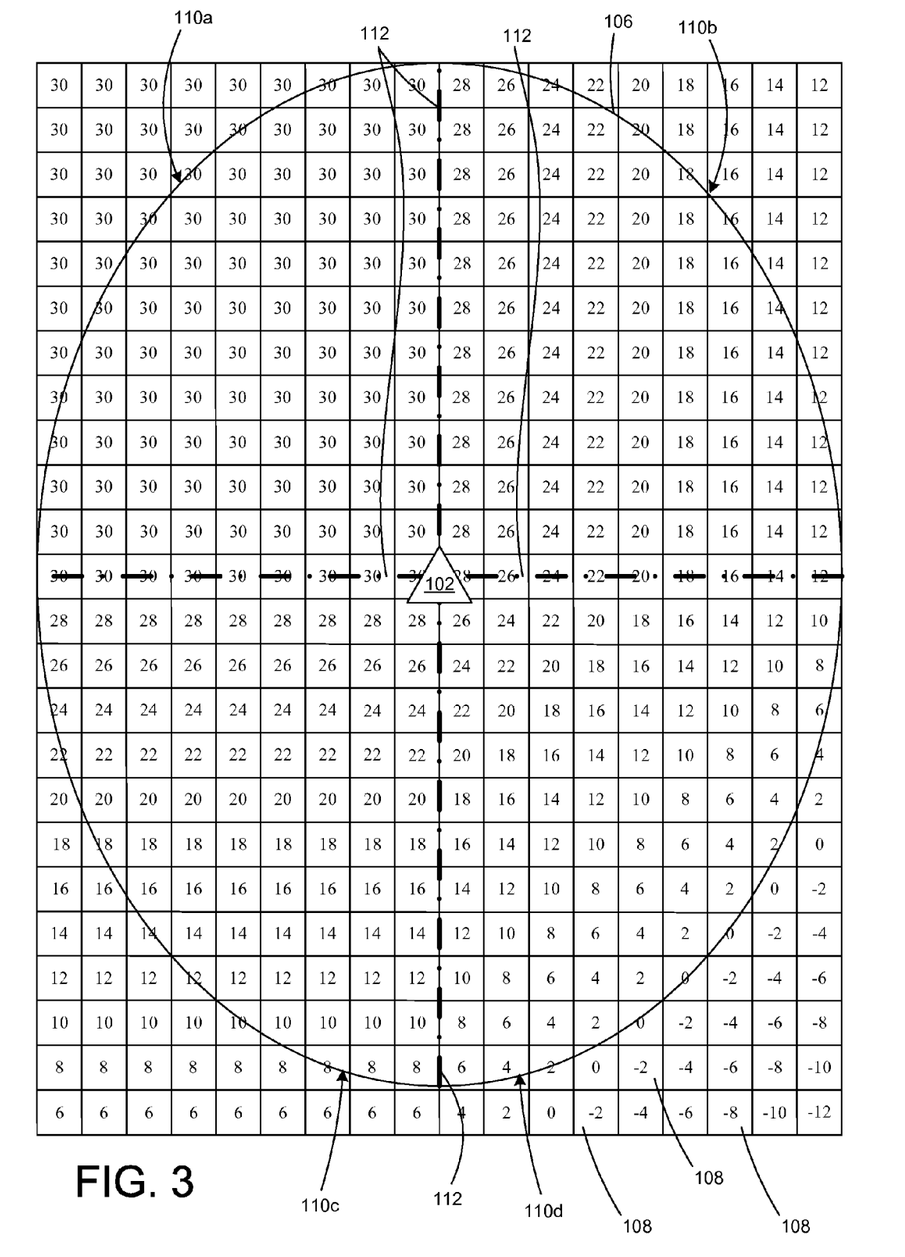
FIG. 3 is a schematic view of a representative spectrum environment in which generic channel authorizations are determined by the system of FIG. 2.

With additional reference to FIG. 3, shown is an exemplary hub radio device 102 surrounded by a corresponding coverage area 106 of the hub radio device 102. In the illustrated example, the coverage area 106 has a maximum range of about 10 miles (about 16 kilometers) from the location of the hub radio device 102. The geographic area that includes the coverage area 106 is divided into square-shaped pixels 108. In each pixel 108, a representative maximum allowable transmit power in dBm for the pixel 108 is shown for a channel that is available to serve as a generic access channel for a spoke radio device 104 (FIG. 2) located in the coverage area 106. The pixels 108 may be shapes other than squares, such as rectangles or hexagons.

In one embodiment, the coverage area 106 of the hub radio device 102 is divided into areas, or sub-regions 110. In the illustrated example, the coverage area 106 is divided into four sub-regions, respectively labeled 110a, 110b, 110c and 110d. A maximum transmit power limit for generic radio operations is determined for each sub-regions 110. A spoke radio device 104 that seeks to communicate under a generic channel authorization determines the sub-region 110 of the coverage area 106 in which it is physically present and uses the corresponding maximum transmit power level for communications with the hub radio device 102. In one embodiment, the sub-regions 110 are non-overlapping but are contiguous with one another so that, when combined, have substantially the same shape and size as the coverage area 106. In a more specific embodiment, the sub-regions 110 are sectors of the coverage area 106. In this case, each sub-region 110 is defined by two radii 112 (shown using dash-dot lines) that extend from the location of the hub radio device 102. The sectors may or may not be further defined by a third leg that coincides with the contour of the coverage area 106. In the case where a third leg is used and the coverage area 106 is a circle or an ellipse, the third leg may be an arc of the circle or the ellipse. In other cases, the third leg will follow the regular or irregular contour of the coverage area 106 between points where the radii 112 intersect the contour. Each sub-region 110 defines a shape and may be expressed or defined in an appropriate manner, such as using an Environmental Systems Research Institute, Inc. (ESRI) shapefile (e.g., .shp file format), using azimuths and/or vectors relative to the location of the hub radio device 102, pixels, GIS coordinates, etc.

In the illustrated example of FIG. 3, the coverage area 106 of the hub radio device 102 is divided into four sub-regions 110, each of which is an equally sized sector (by azimuth). It will be understood that there may be more than or less than four sub-regions 110. Also, the sub-regions 110 need not be sectors and need not have equal sizes.

A maximum transmit power level for use in generic access communications for a channel may be identified for each sub-region 110. The maximum transmit power level for a sub-region 110 for a given channel is the lowest allowable transmit power value found in any of the pixels that overlap with the sub-regions 110. In the illustrated example of FIG. 3, the maximum transmit power level for use in generic access communications for an exemplary channel is +12 dBm for the sub-region 110b (the upper right quadrant of the coverage area 106 between 0° and 90°). For the same channel, the maximum transmit power level for use in generic access communications is 0 dBm for the sub-region 110d (the lower right quadrant between 90° and 180°). For the same channel, the maximum transmit power level for use in generic access communications is +8 dBm for the sub-region 110c (the lower left quadrant between 180° and 270°). Similarly, for the same channel, the maximum transmit power level for use in generic access communications for the sub-region 110a is +30 dBm (the upper left quadrant between 270° and 360°).

The maximum transmit power level for each sub-region 110 is the generic transmit power limit found in the sub-region 110. The variation in results among the sub-regions 110 provides a distinct advantage over using the lowest generic transmit power level for the entire coverage area 106 of the hub radio device 102. This is because a spoke radio device 104 in any sub-region 110 other than the sub-region 110 with the lowest generic transmit power for the entire coverage area 106 may transmit with more power than is allowed in the conventional approach.

A format may be established to communicate the generic operating parameters for each sub-region 110. The generic operating parameters for each sub-region 110 may be broadcast in a beacon transmitted by the hub radio device 102. The beacon also may include information that geographically defines each sub-region 110.

In one exemplary embodiment, the information includes location of the hub radio device 102 (e.g., specified by latitude and longitude) and, for each channel, an identification of each sub-region 110 and, for each channel/sub-region combination, a transmit power value. When the sub-regions 110 are sectors, each sub-region 110 may be identified by a pair of azimuths (e.g., an azimuth start and an azimuth stop). Thus, the information may be provided in list or table form, such as set forth in representative table 2. Table 2 is populated with exemplary data, but excludes latitude and longitude values for the location of the hub radio device 102 since this data may be identified separately. Also identified separately may be information that geographically identifies each sub-region 110. Data to geographically identify each sub-region 110 for this example is set forth in table 3. It will be appreciated that the information from tables 2 and 3 may be merged. In the examples, thirteen channels are identified. It will be appreciated that there may be more than 13 channels or less than 13 channels. Also, in one embodiment, the data may exclude channels that the hub radio device 102 is not authorized to use (e.g., channels not specified as available in the hub's specific white space channel list).

TABLE 2

| Channel | Area 1 | Area 2 | Area 3 | Area 4 |
| --- | --- | --- | --- | --- |
| CH1 | 12 dBm | 0 dBm | 8 dBm | 30 dBm |
| CH2 | 12 dBm | 12 dBm | 15 dBm | 18 dBm |
| . | . | . | . | . |
| . | . | . | . | . |
| . | . | . | . | . |
| CH13 | 30 dBm | 17 dBm | 3 dBm | 11 dBm |

TABLE 3

| Area 1 | | Area 2 | | Area 3 | | Area 4 | |
| --- | --- | --- | --- | --- | --- | --- | --- |
| Azimuth Start | Azimuth Stop | Azimuth Start | Azimuth Stop | Azimuth Start | Azimuth Stop | Azimuth Start | Azimuth Stop |
| 0° | 90° | 90° | 180° | 180° | 270° | 270° | 360° |

As indicated, the permissible spoke operating parameters, including the sub-region definitions, may be determined by the central server 100.

After receiving the beacon from the hub radio device 102, the spoke radio device 104 may determine a channel and transmit power to use to initiate a communication link with the hub radio device 102. As part of this determination, the spoke radio device 104 may be responsible for identifying the sub-region 110 in which the spoke radio device 104 is located. In one embodiment, the spoke radio device 103 is a location-aware cognitive radio and may determine its location using a location acquisition means (e.g., a GPS receiver) or from stored information (e.g., in the case of a fixed-location device, a location programmed by an installer). This location may be compared to the location of the hub radio device 102 to calculate an azimuth angle from the hub radio device 102 to the spoke radio device 104. This azimuth value is compared against the azimuth start and stop angles that are used to geographically identify the sub-regions 110 so as to identify the sub-region 110 in which the spoke radio device 104 is located. If the sub-regions 104 are specified in other ways (e.g., GIS data, a collection of coordinates, etc.), other appropriate approaches may be used by the spoke radio device 104 to determine the sub-region 110 in which the spoke radio device 104 is located.

Once the sub-region 140 in which the spoke radio device 104 is located is determined, the spoke radio device 104 may select a channel from the channels identified in the beacon. The selected channel may be the channel with the highest allowable transmit power for the sub-region 110 in which the spoke is located. In another embodiment, channel selection may be based on other information, such as a preferred channel indication from the hub radio device 102. Once the channel is selected, the source radio device 104 may attempt to establish a communication link with the hub radio device 102 for purposes of acquiring specific channel authorization from the server 100.

The disclosed techniques result in finer resolution generic operating parameters than the conventional approach by using logically partitioned "sub" areas of the coverage area 106 of the hub radio device 102. The number of sub-regions 110 may be selected (e.g., optimized) to balance the amount of data that is included in beacons broadcast by the hub radio device 102 versus attempting to increase the potential for the spoke radio device 104 to be located in a sub-region 110 with a relatively high transmit power limit for one or more channels.

In one embodiment, the hub radio device 102 communicates with the server 100 to acquire the generic operating parameters for inclusion in the beacon. The server 100 may determine the sub-regions 110 or the hub radio device 102 may determine the sub-regions 110. In either case, the server 100 assesses known data regarding protected transmitters to determine the generic transmit power value for each sub-region 110 and for each channel on which the hub radio device 02 may engage in generic radio access communications with spoke radio devices 104. The server 100 may make modifications to the generic transmit power values if there is a change in the spectrum environment, such as when a new protected transmitter becomes present.

It will be understood that some of the described operations are carried out by the server 100, some of the operations are carried out by the hub radio device 102, and some of the operations are carried out by the spoke radio device 104. Tasks carried out by each device respectively may be considered a method carried out by that device. For these purposes, each of these devices includes appropriate control circuitry and/or processors and memory components. Logical instructions to carry out the respective processes may be embodied as software that is executed by the relevant device and that is stored on a non-transitory computer readable medium (e.g., computer memory) of the relevant device.

FIG. 2 is a schematic block diagram of an exemplary system for implementing the disclosed techniques. The hub radio device 102 may be or may include any type of electronic device that engages in wireless communications, such a computing device, an information and/or entertainment system, a modem and router for providing Internet connectivity to other devices, etc. In a typical embodiment, the hub radio device 102 is a fixed-location device, but could be a mobile device, such as a mobile phone, tablet, etc. Similarly, the spoke radio device 104 may be or may include any type of fixed or mobile electronic device that engages in wireless communications, such a computing device, an information and/or entertainment system, a mobile phone, a modem and router for providing Internet connectivity to other devices, etc.

The server 100 communicates with the hub radio device 102 over any appropriate communications medium 114, such as one or more of the Internet, a cellular network, a WiFi network, etc. In addition to carrying out the operations described herein, the server 100 may be a central white space registration system or some other form of spectrum management platform.

The spoke radio device 104 is location aware. For instance, the spoke radio device 104 may be capable of determining its position (also referred to as geo-location) using a location-determining technique, such as GPS or other technology. In some embodiments, the spoke radio device 104 may have a GPS receiver that is used to receive GPS satellite signals from which position coordinates are triangulated. Furthermore, if the spoke radio device 104 is a mobile device, it may be capable of manually or autonomously updating its determined position as it moves.

The spoke radio device 104 includes communications circuitry, such as radio circuitry 116. The radio circuitry 116 may include one or more radio modems (e.g., radio transceivers) and corresponding antenna assemblies to allow for communications over various types of network connections and/or protocols. The radio circuitry 116 may be used to carry out various wireless communications functions, including communicating with the hub radio device 102 using generic access credentials. The spoke radio device 104 may use the hub radio device 102 as a proxy to gain specific access credentials or may communicate with the server 100 via the hub radio device 102 to gain specific access credentials. Once specific access credentials are acquired by the spoke radio device 104, the spoke radio device 104 may engage in various communications functions such as, but not limited to, engaging in voice or video calls, and sending or receiving messages (e.g., email messages, text messages, multimedia messages, instant messages, etc.), accessing the Internet, transferring data (e.g., streaming video, obtaining or sending files), etc.

Overall functionality of the spoke radio device 104 may be controlled by a control circuit that includes a processing device 118. The processing device 118 may execute code that is stored in a memory 120. For instance, the processing device 118 may be used to execute an operating system and other applications that are installed on the spoke radio device 104. The operating system or applications may include executable logic to implement the functions of the spoke radio device 104 that are described herein. The memory 120 is a non-transitory computer readable medium and may be, for example, one or more of a buffer, a flash memory, a hard drive, a removable media, a volatile memory, a non-volatile memory, a random access memory (RAM), or other suitable device. In a typical arrangement, the memory 120 includes a non-volatile memory for long term data storage and a volatile memory that functions as system memory for the control circuit.

The spoke radio device 104 may include any other appropriate components such as, but not limited to, a display, a speaker, a microphone, a user interface (e.g., a keypad and/or a touch-sensitive input), motion sensors, etc.

Similar to the spoke radio device 104, the hub radio device 102 includes communications circuitry, such as radio circuitry 122. The radio circuitry 122 may include one or more radio modems (e.g., radio transceivers) and corresponding antenna assemblies to allow for communications over various types of network connections and/or protocols. The radio circuitry 122 may be used to carry out various wireless communications functions, including communicating with the spoke radio device 104 using generic access credentials.

Overall functionality of the hub radio device 102 may be controlled by a control circuit that includes a processing device 124. The processing device 124 may execute code that is stored in a memory 126. For instance, the processing device 124 may be used to execute an operating system and other applications that are installed on the hub radio device 102. The operating system or applications may include executable logic to implement the functions of the hub radio device 102 that are described herein. The memory 126 is a non-transitory computer readable medium and may be, for example, one or more of a buffer, a flash memory, a hard drive, a removable media, a volatile memory, a non-volatile memory, a random access memory (RAM), or other suitable device. In a typical arrangement, the memory 126 includes a non-volatile memory for long term data storage and a volatile memory that functions as system memory for the control circuit.

The hub radio device 102 may include any other appropriate components such as, but not limited to, a display, a speaker, a microphone, a user interface (e.g., a keypad and/or a touch-sensitive input), motion sensors, etc.

The server 100 may be implemented as a computer-based system that is capable of executing computer applications (e.g., software programs), including a spectrum management function 128 that, when executed, carries out functions of the server 100 that are described herein. The spectrum management function 128 and a database 130 may be stored on a non-transitory computer readable medium, such as a memory 132. The database 130 may be used to store various information sets used to carry out the functions described in this disclosure. For instance, the server 100 may store or access data about known protected radio devices. The memory 132 may be a magnetic, optical or electronic storage device (e.g., hard disk, optical disk, flash memory, etc.), and may comprise several devices, including volatile and non-volatile memory components. Accordingly, the memory 132 may include, for example, random access memory (RAM) for acting as system memory, read-only memory (ROM), solid-state drives, hard disks, optical disks (e.g., CDs and DVDs), tapes, flash devices and/or other memory components, plus associated drives, players and/or readers for the memory devices.

To execute logical operations, the server 100 may include one or more processors 134 used to execute instructions that carry out logic routines. The processor 134 and the memory 132 may be coupled using a local interface 136. The local interface 136 may be, for example, a data bus with accompanying control bus, a network, or other subsystem.

The server 100 may have various input/output (I/O) interfaces for operatively connecting to various peripheral devices, as well as one or more communications interfaces 138. The communications interface 138 may include for example, a modem and/or a network interface card. The communications interface 138 may enable the server 10 to send and receive data signals, voice signals, video signals, and the like to and from other computing devices via an external network. In particular, the communications interface 138 may operatively connect the server 100 to the communications medium 114.

In one embodiment, the server 100 may be configured to host the above-described services for a plurality of electronic devices, including the hub and spoke radio devices 102, 104. In some embodiments, the services may include spectrum management functions, such as providing channel lists, specific channel access credentials and/or generic channel access credentials to qualified radio devices upon registration so as to allow the radio devices to make use of spectrum for wireless communications. Also, while the providing of services may be fully automated, the server 100 may host an Internet-style website for the various corresponding parties to conduct initial enrollment with the server 100, conduct manual registration if needed, access various tools and reports supplied by the server 100, and so forth. For supplying the services, the server 100 may collect spectrum usage information from various sources, including but not limited to public databases, private databases and deployed radio devices (e.g., in the form of channel use selections or spectrum sensing results). The database information may contain information about known spectrum users, such as incumbent spectrum users (e.g., digital television stations, wireless microphone systems, cable head end systems, FM radio stations, etc.), licensed spectrum users, or radio systems that are exempt from seeking channel map information in order to operate.

In embodiments in this disclosure, the server may undertake spectrum management functions other than those that are described in detail, such as responding to white space channel list requests with appropriate channel lists. Therefore, in some embodiments, the server may be considered a central spectrum "database" or white space registration/allocation system.

Aspects of the disclosed systems and methods are independent of the type or types of devices that may use spectrum. As such, the systems and methods may be applied in any operational context for wireless communications, and wireless communications are expressly intended to encompass unidirectional signal transmissions (e.g., broadcasting of a signal for receipt by a device without response) and to encompass bidirectional communications where devices engage in the exchange of signals. The methods and systems may be applied to dumb and/or cognitive radio devices. The methods and systems may be applied to licensed or unlicensed spectrum, including but not limited to shared spectrum environments such as white spaces (e.g., TV white spaces or TVWS) where available channels are interleaved with licensed channels. Furthermore, the methods and systems are generic to modulation schemes, harmonic considerations, frequency bands or channels used by the electronic device, the type of data or information that is transmitted, how the electronic device uses received information, and other similar communications considerations. Thus, the systems and methods have application in any suitable environment.

Although certain embodiments have been shown and described, it is understood that equivalents and modifications falling within the scope of the appended claims will occur to others who are skilled in the art upon the reading and understanding of this specification.

What is claimed is:

1. A spectrum management server, comprising:
   a communications interface over which communications with a hub radio device are made, wherein spectrum access requests for a spoke radio device are received at the spectrum management server by way of the hub radio device; and
   a processor that executes logical instructions to generate generic channel access credentials used by the spoke radio device to wirelessly communicate with the hub radio device before specific channel access credentials are supplied to the spoke radio device, the logical instructions configure the spectrum management server to:
   determine a coverage area of the hub radio device and determine sub-regions of the coverage area;
   determine a generic access transmit power limit for each sub-region of the coverage area for one or more channels on which the hub radio device has specific channel access credentials to engage in wireless communications; and
   transmit the generic access transmit power level for each sub-region and channel combination to the hub radio device; and
   wherein the sub-regions of the coverage area are segments of the coverage area defined by a first azimuth and a second azimuth relative to a location of the hub radio device.

2. A spectrum management server, comprising:
   a communications interface over which communications with a hub radio device are made, wherein spectrum access requests for a spoke radio device are received at the spectrum management server by way of the hub radio device; and
   a processor that executes logical instructions to generate generic channel access credentials used by the spoke radio device to wirelessly communicate with the hub radio device before specific channel access credentials are supplied to the spoke radio device, the logical instructions configure the spectrum management server to:
   determine a coverage area of the hub radio device and determine sub-regions of the coverage area;
   determine a generic access transmit power limit for each sub-region of the coverage area for one or more channels on which the hub radio device has specific channel access credentials to engage in wireless communications; and
   transmit the generic access transmit power level for each sub-region and channel combination to the hub radio device; and
   wherein the spectrum management server logically overlaps the coverage area with pixels of known geographic location and size;
   wherein the spectrum management server determines, for each pixel, a maximum transmit power level; and
   wherein the generic access transmit power limit for each sub-region and channel combination is determined by the spectrum management server by identifying the lowest maximum transmit power level for all pixels overlapping the sub-region of the coverage area.

3. The spectrum management server of claim 2, wherein the maximum transmit power levels for the pixels are a function of operational characteristics of protected transmitters operating near the hub radio device.

4. A hub radio device, comprising:
   radio circuitry configured to engage in wireless communications using specific channel access credentials, the hub radio device having a coverage area that is divided into sub-regions, and the specific channel access credentials acquired from a spectrum management server with which the hub radio device communicates over a communication medium that does not cause interference to protected radio devices; and
   a control circuit that executes logical instructions to configure the hub radio device to:

receive a generic access transmit power limit for each sub-region of the coverage area for one or more of the channels in which the hub radio device has specific channel access credentials;

broadcast a beacon with the radio circuitry containing the generic access transmit power limit for each sub-region and channel combination; and establish a communication link with a spoke radio device operating under generic channel access credentials that conform to the generic access transmit power limit for one of the sub-region and channel combinations specified in the beacon, the spoke radio device acquires specific channel access credentials for a location of the spoke radio device from the spectrum management server by way of the communication link, the hub radio device and the communication medium; and wherein the beacon further contains an identification of a location of the hub and a geographic identification of each sub-region.

5. The hub radio device of claim 4, wherein the sub-regions of the coverage area are segments of the coverage area defined by a first azimuth and a second azimuth relative to the location of the hub radio device.

6. A spoke radio device, comprising:

radio circuitry configured to engage in wireless communications, the wireless communications including establishing a link with a hub radio device using generic channel access credentials to support acquisition of specific channel access credentials from a spectrum management server; and a control circuit that executes logical instructions to configure the spoke radio device to:

receive a beacon from the hub radio device containing the generic channel access credentials, the generic access credentials including a generic access transmit power limit for each of plural sub-regions of a coverage area of the hub radio device and for one or more of the channels for which the hub radio device has specific channel access credentials;

identify one of the sub-regions of the coverage area of the hub radio device in which the spoke radio device is located; and select a channel from the beacon, and wherein the link is established using the generic access transmit power limit corresponding the selected channel and identified sub-region in which the spoke radio device is located; and wherein the selected channel is the channel with the highest generic access transmit power limit for the identified sub-region in which the spoke radio device is located.

7. A spoke radio device, comprising:

radio circuitry configured to engage in wireless communications, the wireless communications including establishing a link with a hub radio device using generic channel access credentials to support acquisition of specific channel access credentials from a spectrum management server; and a control circuit that executes logical instructions to configure the spoke radio device to:

receive a beacon from the hub radio device containing the generic channel access credentials, the generic access credentials including a generic access transmit power limit for each of plural sub-regions of a coverage area of the hub radio device and for one or more of the channels for which the hub radio device has specific channel access credentials;

identify one of the sub-regions of the coverage area of the hub radio device in which the spoke radio device is located; and select a channel from the beacon, and wherein the link is established using the generic access transmit power limit corresponding the selected channel and identified sub-region in which the spoke radio device is located; and wherein the spoke radio device identifies the sub-region in which the spoke radio device is located by identifying an azimuth between the hub radio device and the spoke radio device and comparing the identified azimuth to start and stop azimuths used to define each sub-region of the coverage area of the hub radio device.

\* \* \* \* \*